(12) United States Patent
Takenaka et al.

(10) Patent No.: US 11,962,183 B2
(45) Date of Patent: Apr. 16, 2024

(54) BACKUP POWER SYSTEM

(71) Applicant: Panasonic Intellectual Property Management Co., Ltd., Osaka (JP)

(72) Inventors: Kazuo Takenaka, Osaka (JP); Takashi Higashide, Osaka (JP); Katsunori Atago, Fukushima (JP); Youichi Kageyama, Osaka (JP); Hisao Hiragi, Osaka (JP); Yugo Setsu, Osaka (JP); Hiroki Nishinaka, Osaka (JP); Shinichi Tanida, Osaka (JP)

(73) Assignee: PANASONIC INTELLECTUAL PROPERTY MANAGEMENT CO., LTD., Kadoma (JP)

( * ) Notice: Subject to any disclaimer, the term of this patent is extended or adjusted under 35 U.S.C. 154(b) by 209 days.

(21) Appl. No.: 17/612,892

(22) PCT Filed: Jun. 3, 2020

(86) PCT No.: PCT/JP2020/021953
§ 371 (c)(1),
(2) Date: Nov. 19, 2021

(87) PCT Pub. No.: WO2021/005924
PCT Pub. Date: Jan. 14, 2021

(65) Prior Publication Data
US 2022/0224148 A1    Jul. 14, 2022

(30) Foreign Application Priority Data
Jul. 5, 2019    (JP) .................................. 2019-125987

(51) Int. Cl.
*H02J 9/06* (2006.01)
*H02J 7/00* (2006.01)

(52) U.S. Cl.
CPC ............ *H02J 9/061* (2013.01); *H02J 7/0063* (2013.01); *H02J 7/0068* (2013.01); *H02J 7/007182* (2020.01)

(58) Field of Classification Search
CPC .. H02J 9/061; H02J 9/06; H02J 7/0063; H02J 7/0068; H02J 7/007182; H02J 7/342; H02J 7/34; B60R 16/03; B60R 16/033
See application file for complete search history.

(56) References Cited

U.S. PATENT DOCUMENTS

2015/0001926 A1    1/2015    Kageyama et al.
2019/0305587 A1    10/2019   Teng
(Continued)

FOREIGN PATENT DOCUMENTS

JP    2014-143814    8/2014
JP    2014-233142    12/2014
(Continued)

OTHER PUBLICATIONS

International Search Report of PCT application No. PCT/JP2020/021953 dated Jul. 28, 2020.

*Primary Examiner* — Hal Kaplan
*Assistant Examiner* — Rasem Mourad
(74) *Attorney, Agent, or Firm* — WHDA, LLP

(57) ABSTRACT

A backup power system according to the present disclosure includes a battery, a charging circuit, power storage, a first load, a second load, and a controller that controls the charging circuit. The controller causes an input current at the charging circuit to increase at a first rate of change in response to a start signal. When the controller detects an increase in a charging voltage at the power storage up to a first voltage at which driving of the first load is possible, the controller controls the charging circuit to cause the input current at the charging circuit to increase at a second rate of change lower than the first rate of change. The charging (Continued)

circuit is controlled by the controller to cause the input current to increase at the second rate of change, and the charging voltage at the power storage increases up to a second voltage at which driving of both the first load and the second load is possible.

4 Claims, 2 Drawing Sheets

(56) References Cited

U.S. PATENT DOCUMENTS

2020/0259363 A1* 8/2020 Fukae ................... B60R 16/03
2021/0249895 A1* 8/2021 Terada .................. H02J 7/0068
2021/0384757 A1* 12/2021 Sawano ................. H02J 7/345

FOREIGN PATENT DOCUMENTS

| JP | 2014233142 A | * 12/2014 |
| JP | 2018-068019 | 4/2018 |
| WO | 2013/125170 | 8/2013 |

* cited by examiner

BACKUP POWER SYSTEM

TECHNICAL FIELD

The present disclosure relates to backup power systems used in various vehicles.

BACKGROUND ART

Hereinafter, a conventional backup power device will be described. In a conventional backup power device that includes a vehicle battery, a charging circuit connected to the vehicle battery, and power storage, electric power to be output from a backup power supply in the event of an emergency is supplied from the vehicle battery to the power storage through the charging circuit at normal times.

Note that Patent Literature (PTL) 1, for example, is known as related art document information pertaining to the present disclosure.

CITATION LIST

Patent Literature

PTL 1: International Publication No. 2013-125170

SUMMARY OF THE INVENTION

A backup power system according to the present disclosure includes: a battery; a charging circuit electrically connected to the battery; power storage configured to be charged by the charging circuit; a first load electrically connected to the power storage; a second load electrically connected to the power storage; and a controller configured to control the charging circuit. The controller detects at least one of an input current at the charging circuit and a charging voltage at the power storage in response to a start signal input to the controller. The controller causes the input current at the charging circuit to increase at a first rate of change in response to the start signal. When the controller detects an increase in the charging voltage at the power storage up to a first voltage at which driving of the first load is possible, the controller causes the charging circuit to cause the input current at the charging circuit to increase at a second rate of change lower than the first rate of change. The charging circuit is controlled by the controller to cause the input current to increase at the second rate of change, and the charging voltage at the power storage increases up to a second voltage at which driving of both the first load and the second load is possible.

DESCRIPTION OF EMBODIMENT

Hereinafter, an exemplary embodiment of the present disclosure will be described with reference to the drawings.

With a conventional backup power device such as that described above, in the case of storing a large amount of electric power into the power storage in a short time, the charging circuit needs to supply the electric power to the power storage using a large amount of electric power or electric current. This means that a device supporting a large amount of electric power or electric current needs to be used in the charging circuit. As a result, the backup power device is large in size. The backup power system according to the present disclosure enables miniaturization.

Exemplary Embodiment

Figure 1:
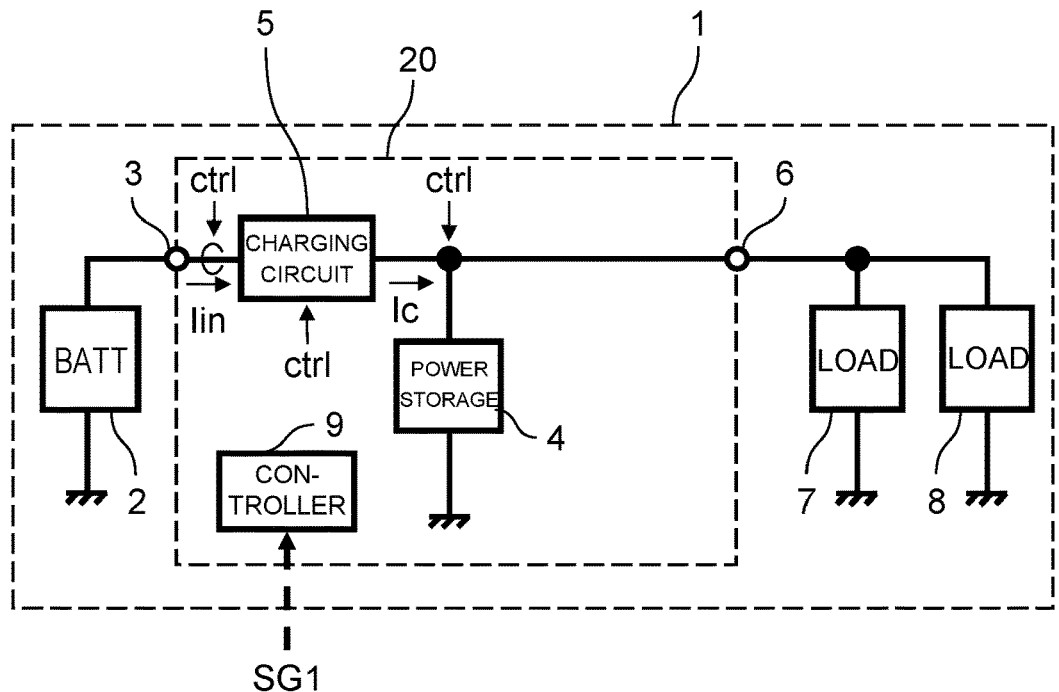
FIG. 1 is a circuit block diagram illustrating the configuration of a backup power system according to an exemplary embodiment of the present disclosure.

FIG. 1 is a circuit block diagram illustrating the configuration of a backup power system according to an exemplary embodiment of the present disclosure. Backup power system 1 includes: backup power device 20 including power storage 4 and charging circuit 5; battery 2 connected to input terminal 3 of backup power device 20; loads 7 and 8 connected to output terminal 6 of backup power device 20; and controller 9.

Note that controller 9 is included in backup power device 20 in the present exemplary embodiment, but this is not necessarily required; it is sufficient that controller 9 be included in backup power system 1.

Battery 2 according to the present exemplary embodiment is a vehicle battery installed in vehicle 10. One example of power storage 4 according to the present exemplary embodiment is a capacitor power storage device capable of charging and discharging with high electric current density, such as an electric double-layer capacitor and a lithium-ion capacitor. Furthermore, the use of a secondary battery including, but not limited to the capacitor power storage device, is possible.

Battery 2 is connected to input terminal 3. Charging circuit 5 is connected between input terminal 3 and power storage 4. Output terminal 6 is connected to power storage 4 and outputs electric power stored in power storage 4. Output terminal 6 is connected to load 7 and load 8.

[Outline of Backup Power System 1]

First, the outline of backup power system 1 will be described with reference to FIG. 1 and FIG. 3. Note that details of backup power system 1 will be described later with reference to FIG. 2 and FIG. 3.

Controller 9 is capable of detecting both of input current Iin at charging circuit 5 and a charging voltage at power storage 4 or at least one of input current Iin at charging circuit 5 and the charging voltage at power storage 4. Furthermore, controller 9 is capable of receiving start signal SG1. Moreover, controller 9 is capable of controlling the operation of charging circuit 5.

Controller 9 receives start signal SG1 and thereby operates charging circuit 5. Input current Iin is changed by controller 9 controlling the operation of charging circuit 5. First, input current Iin is increased at the first rate of change. Subsequently, charging circuit 5 increases charging voltage Vc at power storage 4 up to first voltage V1 at which driving of load 7 is enabled. After charging voltage Vc at power storage 4 is increased up to first voltage V1, input current Iin is increased at the second rate of change until charging voltage Vc at power storage 4 reaches second voltage V2. The second rate of change is smaller in value than the first rate of change. Second voltage V2 is charging voltage Vc at power storage 4 at which driving of both load 7 and load 8 is enabled.

With the above configuration and operation, in the case where power storage 4 is charged using charging circuit 5, the rate of increase of input current Iin at charging circuit 5 per unit time is reduced upon completion of charging of one load (load 7 in the present exemplary embodiment) among a plurality of loads (loads 7 and 8 in the present exemplary embodiment). Note that the completion of charging of a load herein indicates a point in time when electric power supply from the load becomes available. Thus, the maximum value of an electric current flowing to charging circuit 5 is reduced. In the present exemplary embodiment, the electric current capacity of a device used in charging circuit 5 can be reduced, making it possible to miniaturize backup power system 1.

[Details of Backup Power System 1]

Figure 2:
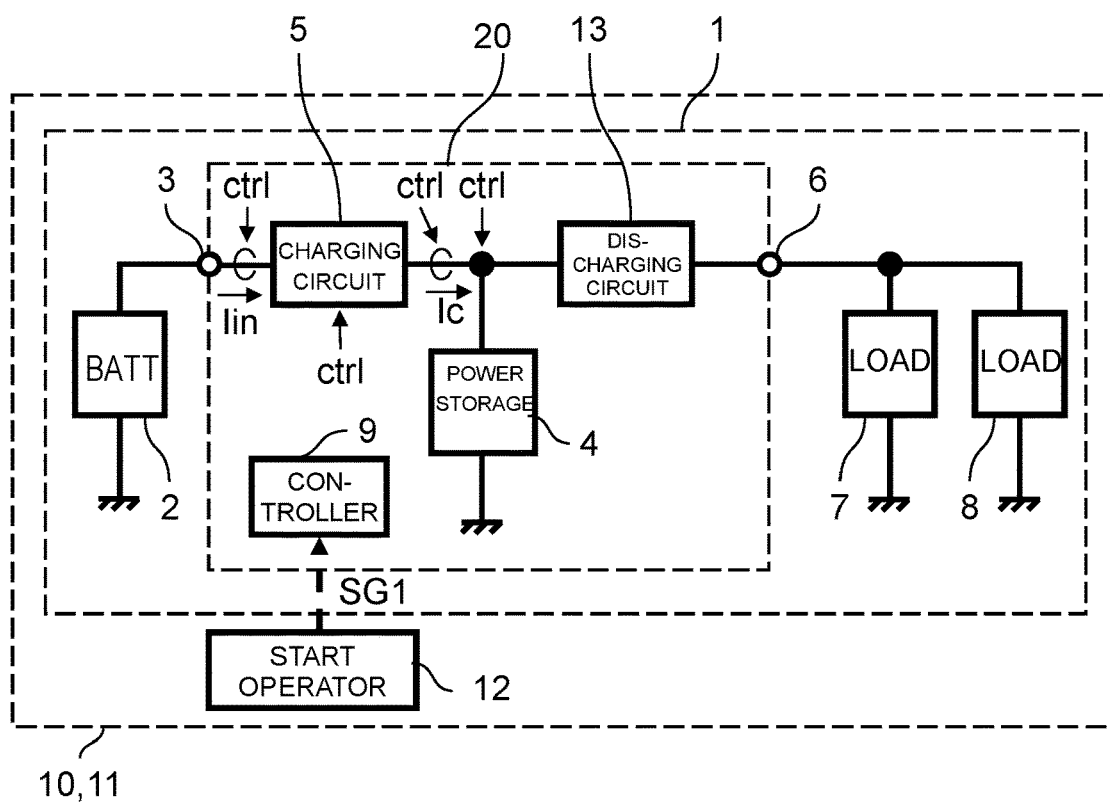
FIG. 2 is a circuit block diagram illustrating a vehicle in which a backup power system according to an exemplary embodiment of the present disclosure is disposed.
Figure 3:
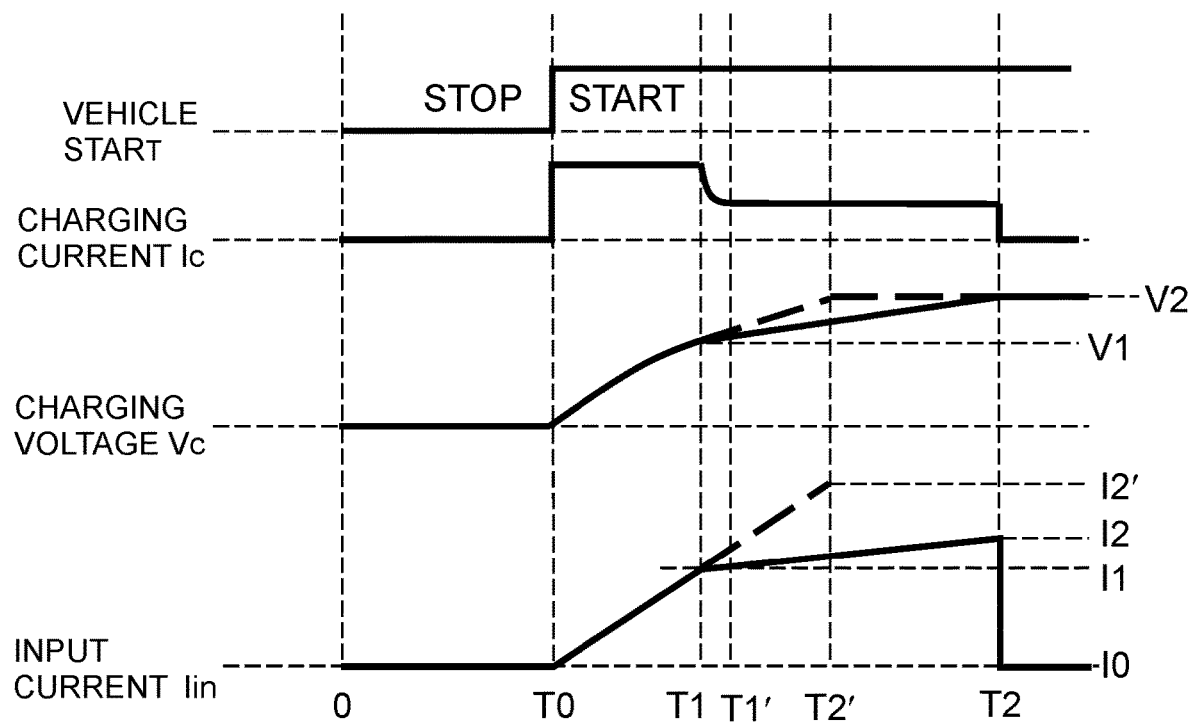
FIG. 3 is an operating characteristic diagram illustrating the operation of a backup power system according to an exemplary embodiment of the present disclosure.

Next, details of backup power system 1 will be described with reference to the circuit block diagram in FIG. 2 illustrating the configuration of vehicle 10 in which backup power system 1 according to an exemplary embodiment of the present disclosure is disposed and the operating characteristic diagram in FIG. 3 illustrating the operation of backup power system 1 according to the exemplary embodiment.

Backup power system 1 is disposed in vehicle 10 (vehicle body 11). When an occupant operates start operator 12, start signal SG1 is transmitted from start operator 12 to controller 9.

At time T0 at which start signal SG1 is transmitted from start operator 12 to controller 9, vehicle 10 is activated. Furthermore, at time T0, charging circuit 5 starts operating according to an instruction from controller 9. When charging circuit 5 starts operating, battery 2 starts charging power storage 4 with electric power.

Note that controller 9 may control input current Iin using an electric current output from charging circuit 5 (charging current Ic). Furthermore, controller 9 may control charging current Ic on the output side using input current Iin at charging circuit 5. Moreover, controller 9 may directly control input current Iin at charging circuit 5. Furthermore, controller 9 may control input current Iin using charging voltage Vc at power storage 4. Moreover, controller 9 may control charging current Ic using charging voltage Vc at power storage 4.

Controller 9 controls charging circuit 5 so as to cause input current Iin to increase from I0 to I1 between time T0 and time T1. The first rate of change corresponding to the rate of increase of input current Iin between time T0 and time T1 is (I1−I0)/(T1−T0). The voltage at power storage 4 reaches first voltage V1 at time T1. When charging voltage Vc at power storage 4 is greater than or equal to first voltage V1, load 7 can be driven using the electric power stored in power storage 4. Input current Iin at time T0, that is, I0, may have any value and may be zero.

In the present exemplary embodiment, load 7 has a function, the operation of which is given priority over load 8. For example, vehicle 10 is propelled by electric power, and load 7 is a device that operates to protect occupants from electric power of vehicle propelling power storage (not illustrated in the drawings) if vehicle 10 has an accident. Examples of the device for protecting occupants from the electric power of the vehicle propelling power storage (not illustrated in the drawings) include a device for cutting off the electric power of the vehicle propelling power storage (not illustrated in the drawings) and a device for causing a propelling load (not illustrated in the drawings) to consume electric power temporarily stored in a propelling power converter (not illustrated in the drawings) to which the electric power of the vehicle propelling power storage (not illustrated in the drawings) is supplied.

Load 8, which comes later than load 7 in the activation sequence in vehicle 10, is a device that operates to protect occupants at the stage following the operation of load 7. Alternatively, load 8 is a device that operates to allow occupants to safely escape out of vehicle 10 at said stage following the operation of load 7. Examples of the device for protecting occupants at the stage following the operation of load 7 may include a device that operates to unlock the doors of vehicle body 11. An alternative example may be a device that operates to open the door latches of vehicle body 11.

Furthermore, as illustrated in FIG. 2, discharging circuit 13 may be disposed between power storage 4 and output terminal 6. Electric power may be supplied from output terminal 6 to loads 7 and 8 after charging voltage Vc at power storage 4 is increased using discharging circuit 13. This makes it possible to drive loads 7 and 8 having various functions.

As illustrated in FIG. 3, charging current Ic is a constant current between time T0 and time T1 in the present exemplary embodiment. Note that charging current Ic may be an electric current that is reduced over time between time T0 and time T1.

Next, after the voltage at power storage 4 reaches first voltage V1 at time T1, controller 9 performs control such that input current Iin continuously increases from I1 to I2 until time T2. The second rate of change corresponding to the rate of increase of input current Iin between time T1 and time T2 is (I2−I1)/(T2−T1), which is smaller in value than the first rate of change mentioned earlier. Time T2 is the time at which charging voltage Vc at power storage 4 reaches second voltage V2. When charging voltage Vc at power storage 4 is greater than or equal to second voltage V2, both load 7 and load 8 can be driven using the electric power stored in power storage 4.

As illustrated in FIG. 3, charging current Ic is a constant current between time T1 and time T2 in the present exemplary embodiment. Note that charging current Ic may be an electric current that is reduced over time between time T1 and time T2.

For the sake of comparison, FIG. 3 indicates, by dashed lines, trajectories that input current Iin and charging voltage Vc at power storage 4 would take if input current Iin kept increasing at the first rate of change. In the case where input current Iin keeps increasing at the first rate of change, charging voltage Vc at power storage 4 reaches second voltage V2 at time T2', which is earlier than time T2. Meanwhile, input current Iin at time T2' is I2' which is greater than I2 mentioned earlier. Therefore, in the case of continuously increasing input current Iin at the first rate of change, it is necessary to increase the electric current capacity of charging circuit 5, and in the case of disposing a protection circuit (not illustrated in the drawings), such as a fuse, between charging circuit 5 and battery 2, it is necessary to increase the electric current capacity of the protection circuit (not illustrated in the drawings).

In this working example, load 7 and load 8 are ranked in priority order, and in the case where power storage 4 is charged using charging circuit 5, the increase in the input current at charging circuit 5 per unit time is reduced upon completion of charging of one load given priority among the plurality of loads, namely, load 7 and load 8, to a level at which electric power can be supplied. Thus, the maximum value of an electric current flowing to charging circuit 5 is reduced. Accordingly, the electric current capacity of a device used in charging circuit 5 can be reduced, making it possible to miniaturize backup power system 1.

Furthermore, when the operation of electric power supply from backup power system 1 to load 7 is preferentially made available after the start of vehicle 10, the operation of at least load 7 is possible even if an emergency occurs in vehicle 10 shortly after the start of vehicle 10. This makes it possible to ensure the safety of vehicle 10 and occupants in vehicle 10.

The switch of input current Iin from the first rate of change to the second rate of change at time T1 may be a continuous change from the first rate of change at time T1 to time T1' later than time T1. This makes it possible to shorten the required period between time T1 and time T2. As a result, driving of both load 7 and load 8 with the electric power stored in power storage 4 is enabled at an early stage.

The present exemplary embodiment is described using a configuration in which backup power system 1 includes backup power device 20 and backup power device 20 includes power storage 4, charging circuit 5, and controller 9 in order to facilitate understanding. However, backup power device 20 is not essential; backup power system 1 may include power storage 4, charging circuit 5, controller 9, battery 2, load 7, and load 8. In the case where backup power device 20 is not provided, for example, a portion of a connection line between charging circuit 5 and battery 2 may be regarded as input terminal 3, and a portion of a connection line between load 7 (or load 8) and power storage 4 may be regarded as output terminal 6. Alternatively, the input terminal of charging circuit 5 may be regarded as input terminal 3, and the output terminal of discharging circuit 13 may be regarded as output terminal 6.

Note that there are cases where load 7 and power storage 4 are connected to each other via a circuit including, but not limited to discharging circuit 13. This is also the case for load 8.

In the present exemplary embodiment, two loads (loads 7 and 8) are described as the load connected to output terminal 6, but three or more loads may be connected to output terminal 6.

CLOSING

Backup power system 1 according to one aspect of the present disclosure includes: battery 2; charging circuit 5 electrically connected to battery 2; power storage 4 configured to be charged by charging circuit 5; load 7 electrically connected to power storage 4; load 8 electrically connected to power storage 4; and controller 9 configured to control charging circuit 5. Controller 9 detects at least one of input current Iin at charging circuit 5 and charging voltage Vc at power storage 4 in response to start signal SG1 input to controller 9. Controller 9 causes input current Iin at charging circuit 5 to increase at a first rate of change in response to start signal SG1. When controller 9 detects an increase in charging voltage Vc at power storage 4 up to first voltage V1 at which driving of load 7 is possible, controller 9 controls charging circuit 5 to cause input current Iin at charging circuit 5 to increase at a second rate of change lower than the first rate of change. Charging circuit 5 is controlled by controller 9 to cause input current Iin to increase at the second rate of change, and charging voltage Vc at power storage 4 increases up to second voltage V2 at which driving of both the first load and the second load is possible.

In backup power system 1 according to another aspect of the present disclosure, input current Iin is switched to continuously change from the first rate of change to the second rate of change.

In backup power system 1 according to another aspect of the present disclosure, discharging circuit 13 is further included, and load 7 and load 8 are connected to power storage 4 via discharging circuit 13.

INDUSTRIAL APPLICABILITY

The backup power system according to the present disclosure has the advantageous effect of enabling miniaturization and is useful in various vehicles.

REFERENCE MARKS IN THE DRAWINGS 1 backup power system
2 battery
3 input terminal
4 power storage
5 charging circuit
6 output terminal
7 load
8 load
9 controller
10 vehicle
11 vehicle body
12 start operator
13 discharging circuit
20 backup power device
Ic charging current
Iin input current
Vc charging voltage

The invention claimed is:

1. A backup power system, comprising:
a battery;
a charging circuit electrically connected to the battery;
power storage configured to be charged by the charging circuit;
a first load electrically connected to the power storage;
a second load electrically connected to the power storage; and
a controller configured to control the charging circuit, wherein
the controller detects an input current at the charging circuit and a charging voltage at the power storage in response to a start signal input to the controller,
the controller causes the input current at the charging circuit to increase at a first rate of change in response to the start signal,
when the controller detects an increase in the charging voltage at the power storage up to a first voltage at which driving of the first load is possible, the controller causes the charging circuit to cause the input current at the charging circuit to increase at a second rate of change lower than the first rate of change, and
the charging circuit is controlled by the controller to cause the input current to increase at the second rate of change, and the charging voltage at the power storage increases up to a second voltage at which driving of both the first load and the second load is possible,
wherein a value of the input current at the charging circuit is higher during the charging at the second rate of change than the input current value during charging at the first rate of change.

2. The backup power system according to claim 1, wherein
the input current is switched to continuously change from the first rate of change to the second rate of change.

3. The backup power system according to claim 1, further comprising:
   a discharging circuit, wherein
     the first load and the second load are connected to the power storage via the discharging circuit.

4. The backup power system according to claim 2, further comprising:
   a discharging circuit, wherein
     the first load and the second load are connected to the power storage via the discharging circuit.

* * * * *